United States Patent [19]

Suzuki

[11] Patent Number: 4,989,957
[45] Date of Patent: Feb. 5, 1991

[54] OBJECTIVE LENS FOR MICROSCOPES

[75] Inventor: Toshinobu Suzuki, Hachiouji, Japan

[73] Assignee: Olympus Optical Co., Ltd., Tokyo, Japan

[21] Appl. No.: 361,644

[22] Filed: Jun. 5, 1989

[30] Foreign Application Priority Data

Jun. 6, 1988 [JP] Japan .................... 63-139125

[51] Int. Cl.⁵ ............................... G02B 21/02
[52] U.S. Cl. ................................ 350/414; 350/478
[58] Field of Search ................ 350/414, 474, 478

[56] References Cited

U.S. PATENT DOCUMENTS 4,403,835 9/1983 Ushida ........................ 351/414
4,666,256 5/1987 Shimizu et al. ................ 350/414

FOREIGN PATENT DOCUMENTS 52-128154 10/1977 Japan .
59-46618 3/1984 Japan .
60-14215 1/1985 Japan .
60-159717 8/1985 Japan .
61-30245 7/1986 Japan .

Primary Examiner—Paul M. Dzierzynski
Attorney, Agent, or Firm—Cushman, Darby & Cushman

[57] ABSTRACT

An objective lens for microscopes comprises a first lens unit, a second lens unit which is movable along an optical axis, and a third lens unit. The second lens unit includes elements of a compound lens component cemented to each other to dispose an optical modulator consisting of an annular phase diaphragm on their cemented surface. The objective lens is capable of canceling variation of aberration caused by a thickness of a cover glass and bringing about a modulated image with favorable contrast.

7 Claims, 5 Drawing Sheets

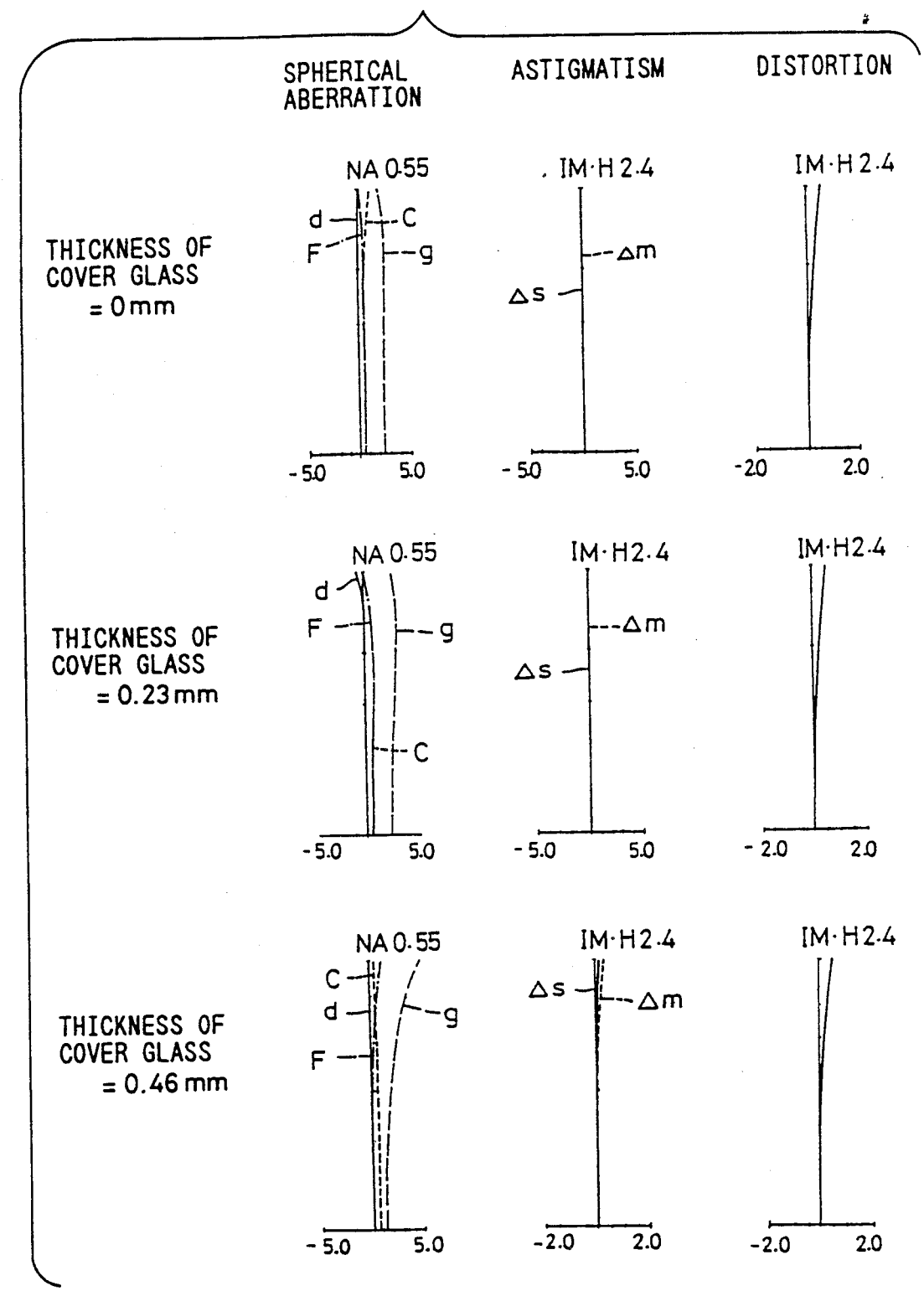

OBJECTIVE LENS FOR MICROSCOPES

BACKGROUND OF THE INVENTION (a) Field of the Invention

The present invention relates to an objective lens for microscopes.

(b) Description of the Prior Art

When numerical aperture(NA) exceeds 0.3 or 0.4 in an objective lens for microscopes, it comes to pass that variation of aberration attributed to a plane parallel glass(i.e., a cover glass) provided between a lens and an object cannot be neglected. Like the case where cellular tissue is observed through the bottom of a cultivating vessel in the field of tissue culture in particular, if the thickness of the plane-parallel plate is approximately 1 mm and varies greatly throughout the whole, difficulties arise that, with common lenses, the variation of aberration is considerable and an image is disturbed. Thus, a method has been known and is often used at present that proper lens unit is selected to be moved along an optical axis by a cam interlocking with a correcting ring, thereby canceling the variation of aberration.

Further, in a phase-contrast microscope or a modulation-contrast microscope, a stop having a particular configuration is arranged in an illuminating system and an optical modulator such as a phase ring(for the phase-contrast microscope) having size corresponding to the aperture of the stop or such as a density pattern(for the modulation-contrast microscope) is provided at an pupil position of an objective lens to modulate part of light transmitting an object so that an object invisible through an ordinary microscope can be observed. This, however, has encountered a problem that, since the optical modulator is fixed at the rear of spaces between the lens units used for correction in a conventional objective lens, the optical modulator is out of the pupil position of the objective lens when the lens units are partially moved by the correcting ring to change the spaces between the lens units.

Although the system of such a type that the optical modulator is out of the pupil position like the conventional obJective lens therefore makes allowance for the size of the optical modulator so as to be capable of performing completely the modulation even in a state of deviation from the pupil position, this has brought about another problem that, when placed at the pupil position, the optical modulator is so enormous in size that light unnecessary for modulation is also modulated and the contrast of the image deteriorates.

SUMMARY OF THE INVENTION

In view of the above problems, it is the object of the present invention to provide an objective lens for microscopes in which, even though an arrangement is made so that spaces between lens units are varied by a correcting ring to thereby cancel variation of aberration, the contrast of an image modulated by an optical modulator is favorable.

This object is accomplished, according to the present invention, by the arrangement that the optical modulator is moved integral with a lens unit to be moved so that even though the lens unit is moved, the optical modulator does not deviate from the pupil position of an objective lens.

According to one aspect of the objective lens for microscopes of the present invention, as diagramed in FIG. 1, the objective lens comprises three lens units $L_1$, $L_2$, $L_3$ in which the lens unit $L_2$ moved for thickness compensation of a cover glass is composed of a poSitive lens and an optical plate which is constructed by cementing two plane-parallel plateS to each other and an annular phase diaphragm(i.e., the optical modulator) P is sticked on its cemented surface. An exit pupil position E of the objective lens is located in the vicinity of the cemented surface of the two plane-parallel plates. The positive lens and the optical plate are constructed so as to be moved integral with each other. When the positive lens of the lens unit $L_2$ is moved toward an object surface M for the thickness compensation of the cover glass, the exit pupil position E of the objective lens is also shifted on the side of the object surface M. At this time, the optical plate is also moved toward the object surface M, with the result that the phase diaphragm P does not deviate from the exit pupil position E. Conversely, when the positive lens of the lens unit $L_2$ is moved toward an image, the exit pupil position E is also shifted on the side of the image and simultaneously the optical plate is also moved toward the image, so that the phase diaphragm P does not deviate from the exit pupil position E. As a consequence of the foregoing, the ring of the phase diaphragm P dispenses with the need for an increase in diameter and as such the contrast of the image of phase difference observation can be rendered favorable.

According to another aspect of the objective lens for microscopes of the present invention, as shown in FIG. 2, the objective lens comprises likewise three lens units $L_1$, $L_2$, $L_3$ and the lens unit $L_2$, among them, moved for the thickness compensation of the cover glass is a compound lens, on the cemented surface of which the annular phase diaphragm P is sticked. The exit pupil position E of the objective lens is located in the vicinity of the cemented surface of the lens unit $L_2$. When the lens unit $L_2$ is moved in front and behind along an optical axis for the thickness compensation of the cover glass, the exit pupil position E of the objective lens is also shifted in front and behind along the optical axis and simultaneously the phase diaphragm P is also moved in front and behind along the optical axis in accordance with the movement of the lens component $L_2$, so that the phase diaphragm P does not deviate from the exit pupil position E. As a result, the ring of the phase diaphragm P dispenses with the need for an increase in diameter and as such the contrast of the image of phase difference observation can be rendered favorable.

This and other objects as well as the features and advantages of the present invention will become apparent from the following detailed description of the preferred embodiments when taken in conjunction with accompanying drawings.

BRIEF DESCRIPTION OF THE DRAWINGS

FIGS. 7 and 8 are views showing a lens configuration and aberration curve diagrams of a third embodiment, respectively.

DESCRIPTION OF THE PREFERRED EMBODIMENTS

Figure 1:
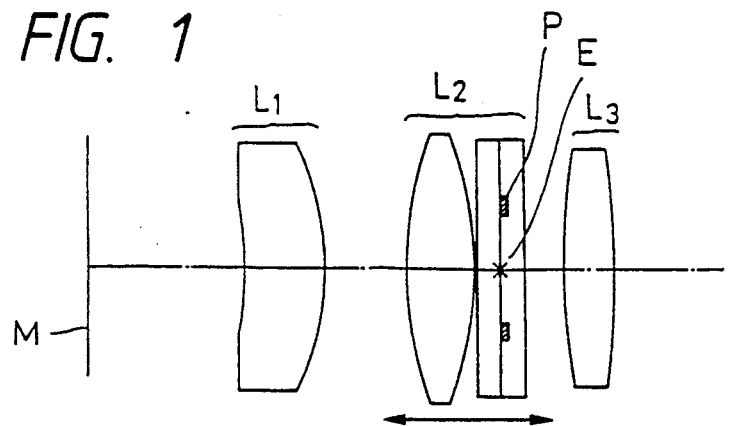
FIGS. 1 and 2 are one and another conceptional views, respectively, of an objective lens for microscopes according to the present invention.
Figure 2:
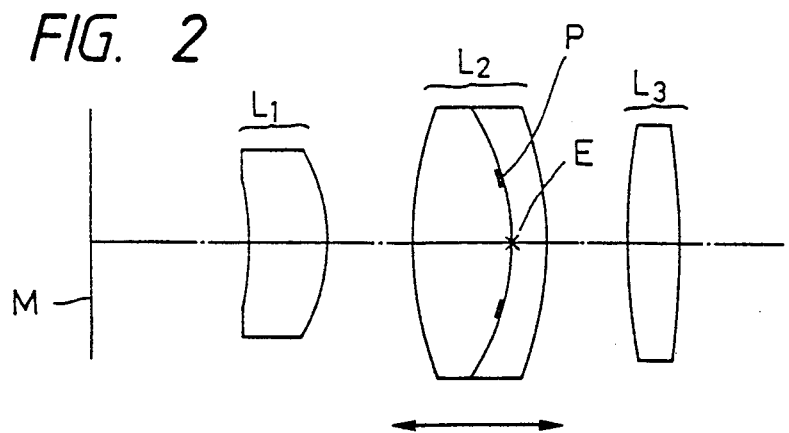

In accordance with the embodiment shown in the following, the present invention will be described in detail.

Any of the embodiments described hereinafter is constructed so that an objective lens comprises three lens units $L_1$, $L_2$, $L_3$ as a whole and the second lens unit $L_2$ is moved in front and behind along an optical axis, and when a compound focal length of the entire lens system is taken as f and a compound focal length of the first lens unit $L_1$ as $f_1$, each embodiment satisfies the following condition.

$$0.7\, f < f_1 < 1.7\, f \qquad (1)$$

This condition (1) is necessary for the purpose of arranging an optical modulator in the second lens unit $L_2$ moved in front and behind along an optical axis, that is, bringing an exit pupil position within the second lens unit $L_2$. If the condition is assumed to be $f_1 \geq 1.7\, f$, the power of the first lens unit $L_1$ weakens and the exit pupil position is located in the rear of the second lens unit $L_2$, with the result that it is impossible to arrange the optical modulator in the second lens unit $L_2$. Further, if the condition is $f_1 \leq 0.7\, f$, excessively high power of the first lens unit $L_1$ renders aberration correction difficult.

Moreover, the third lens unit $L_3$ is constructed from four lens components: a first lens component $L_{31}$ comprising a positive lens and a negative lens cemented to each other, a second lens component $L_{32}$, comprising a negative lens and a positive lens cemented to each other, a third lens component $L_{33}$ comprising a positive lens, and a fourth lens component $L_{34}$ comprising a positive lens and a negative lens cemented to each other, and the objective lens satisfies the following conditions, thereby being able to correct further favorably aberration:

$$0.6\, f < r_{30\,3} < f \qquad (2)$$
$$-0.7\, f < r_{30\,4} < -0.4\, f \qquad (3)$$
$$1.7 < n_{30\,7} \qquad (4)$$
$$0.4\, f < d_{30\,9} + d_{31\,0} \qquad (5)$$

where $r_{303}$ is the radius of curvature of a third surface of the first lens component $L_{31}$, $r_{304}$ is the radius of curvature of a first surface of the second lens component $L_{32}$, $n_{307}$ is the refractive index of the D line of the third lens component $L_{33}$, and $d_{309}$ and $d_{310}$ are the thicknesses of the positive lens and the negative lens of the fourth lens component $L_{34}$, respectively.

Here, the first lens component $L_{31}$ and the second lens component $L_{32}$, of the third lens unit $L_3$, exhibit lens configurations of the so-called "Gauss" type and conditions (2) and (3) are provided to correct favorably curvature of field, asitigmatism and the like. If the conditions turn to $r_{303} \geq f$ and $r_{304} \leq -0.7\, f$, each curvature of these surfaces becomes gentle and an image surface inclines toward a negative. If $r_{303} \leq 0.6\, f$ and $r_{304} \geq -0.4\, f$, the curvature becomes steep and the image surface inclines toward a positive. Further, condition (4) is provided to correct favorably spherical aberration, comatic aberration and the like and, even when the exit pupil position is brought within the second lens unit $L_2$, this condition enables such aberrations to be conveniently corrected. Moreover, condition (5) is necessary for the purpose of bringing the exit pupil position within the second lens unit $L_2$ and, if $d_{309} + d_{310} \leq 0.4\, f$, the exit pupil position is located in the rear of the second lens unit $L_2$, with the result that the optical modulate is out of the exit pupil position.

Numerical data of individual embodiments are shown below.

FIRST EMBODIMENT

Figure 3:
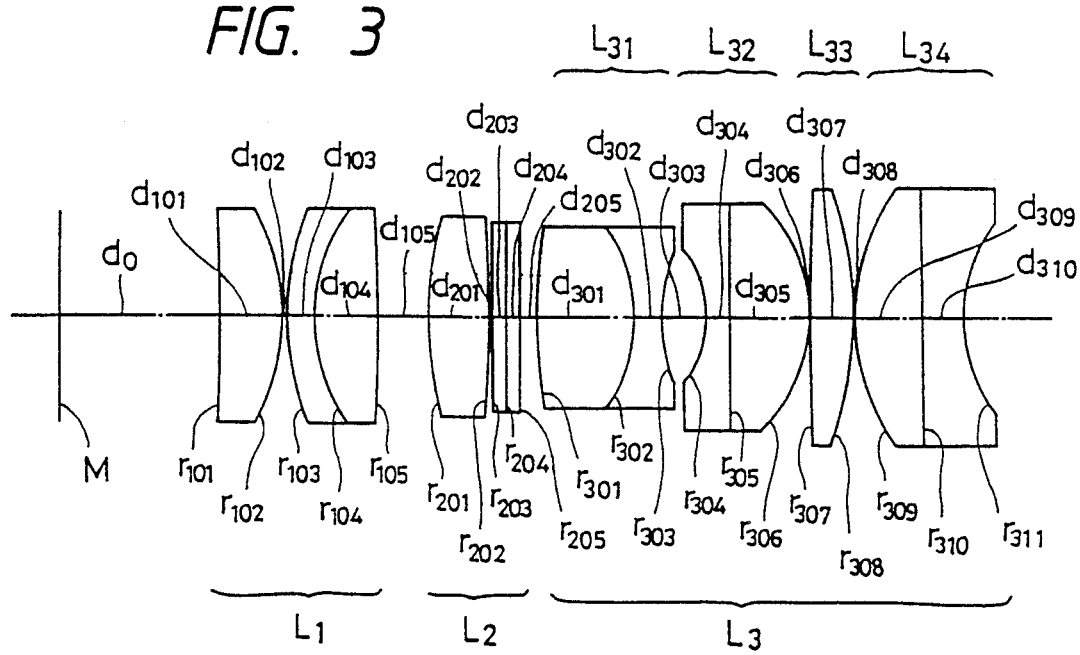
FIGS. 3 and 4 are views showing a lens configuration and aberration curve diagrams of a first embodiment, respectively.
Figure 4:
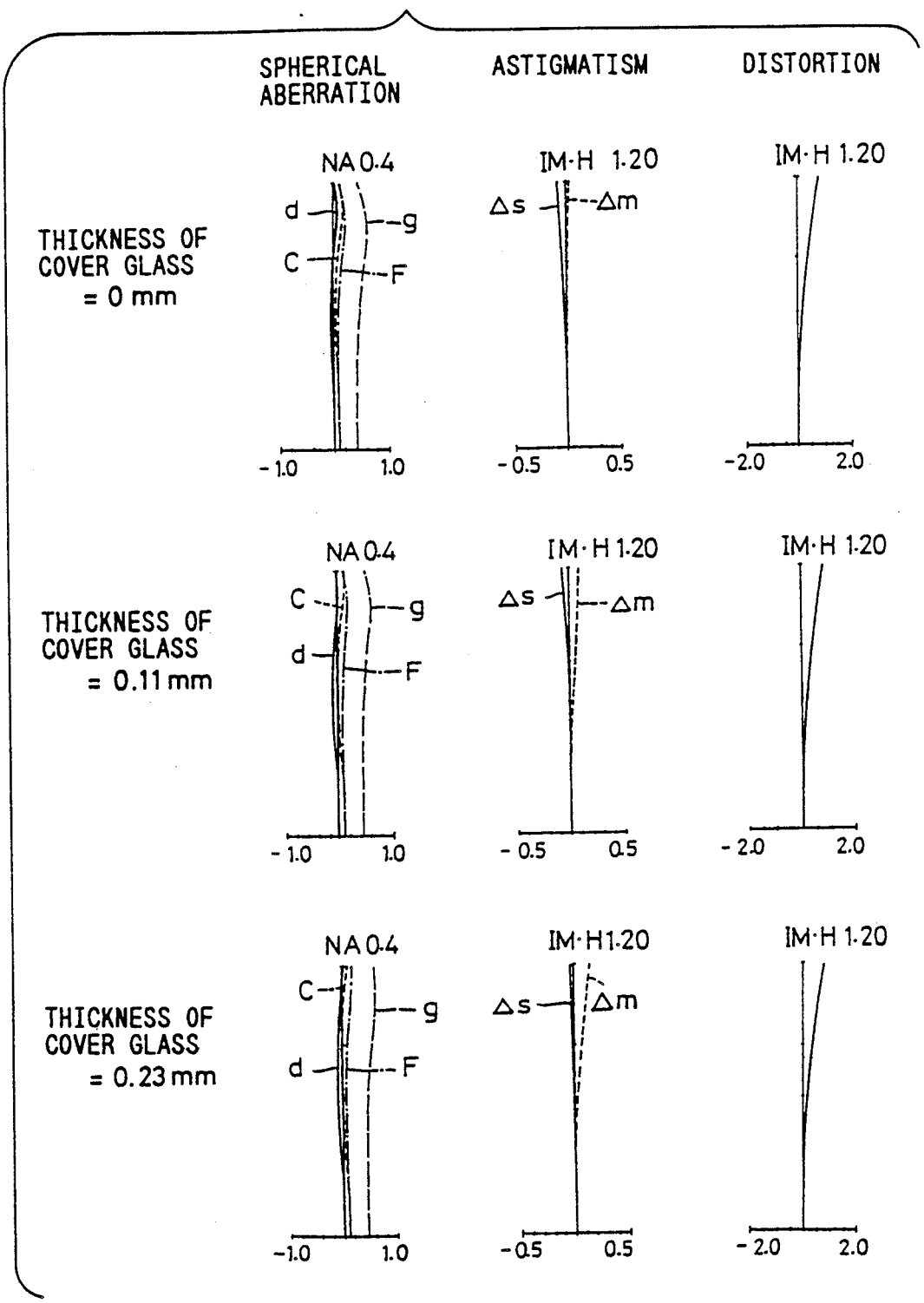

This embodiment has a lens configuration depicted in FIG. 3 and the first lens unit $L_1$ comprises a positive meniscus lens having a convex surface on the image side and a positive cemented doublet. Further, the second lens unit $L_2$ is composed of a positive lens and an optical plate provided with the optical modulator. Also, reference numeral M shown in this figure represents an object. Aberration curves are diagramed in FIG. 4.

| $\beta = 20\times$, $f_1 = 0.897,$ | NA = 0.4, $d_0 = 0.74 \sim 0.57$ | | f = 1. |
|---|---|---|---|
| $r_{101} = -10.900$ | | | |
| | $d_{101} = 0.27$ | $n_{101} = 1.7725$ | $\nu_{101} = 49.66$ |
| $r_{102} = -0.870$ | | | |
| | $d_{102} = 0.02$ | | |
| $r_{103} = 1.271$ | | | |
| | $d_{103} = 0.11$ | $n_{102} = 1.74$ | $\nu_{102} = 31.70$ |
| $r_{104} = 0.784$ | | | |
| | $d_{104} = 0.26$ | $n_{103} = 1.456$ | $\nu_{103} = 90.31$ |
| $r_{105} = -8.906$ | | | |
| | $d_{105} = 0.26 \sim$ 0.15 (variable) | | |
| $r_{201} = 1.591$ | | | |
| | $d_{201} = 0.26$ | $n_{201} = 1.497$ | $\nu_{201} = 81.61$ |
| $r_{202} = -4.904$ | | | |
| | $d_{202} = 0.01$ | | |
| $r_{203} = \infty$ | | | |
| | $d_{203} = 0.06$ | $n_{202} = 1.52287$ | $\nu_{202} = 59.9$ |
| $r_{204} = \infty$ | | | |
| | $d_{204} = 0.06$ | $n_{203} = 1.52287$ | $\nu_{203} = 59.9$ |
| $r_{205} = \infty$ | | | |
| | $d_{205} = 0.02 \sim$ 0.13 (variable) | | |
| $r_{301} = 2.723$ | | | |
| | $d_{301} = 0.40$ | $n_{301} = 1.497$ | $\nu_{301} = 81.61$ |
| $r_{302} = -0.664$ | | | |
| | $d_{302} = 0.11$ | $n_{302} = 1.74$ | $\nu_{302} = 31.7$ |
| $r_{303} = 0.891$ | | | |
| | $d_{303} = 0.19$ | | |
| $r_{304} = -0.439$ | | | |
| | $d_{304} = 0.09$ | $n_{303} = 1.74$ | $\nu_{303} = 31.7$ |
| $r_{305} = \infty$ | | | |
| | $d_{305} = 0.33$ | $n_{304} = 1.497$ | $\nu_{304} = 81.61$ |
| $r_{306} = -0.625$ | | | |
| | $d_{306} = 0.01$ | | |
| $r_{307} = 24.511$ | | | |
| | $d_{307} = 0.17$ | $n_{305} = 1.80518$ | $\nu_{305} = 25.43$ |
| $r_{308} = -1.716$ | | | |
| | $d_{308} = 0.01$ | | |
| $r_{309} = 0.897$ | | | |
| | $d_{309} = 0.28$ | $n_{306} = 1.67$ | $\nu_{306} = 57.33$ |
| $r_{310} = \infty$ | | | |
| | $d_{310} = 0.17$ | $n_{307} = 1.62374$ | $\nu_{307} = 47.1$ |
| $r_{311} = 0.712$ | | | |

| Thickness of cover glass | $d_0$ | $d_{105}$ | $d_{205}$ |
|---|---|---|---|
| 0 | 0.74 | 0.26 | 0.02 |
| 0.11 | 0.65 | 0.21 | 0.08 |
| 0.23 | 0.57 | 0.15 | 0.13 |

The optical modulator is provided on the surface of $r_{204}$ in the second lens unit $L_2$.

SECOND EMBODIMENT

Figure 5:
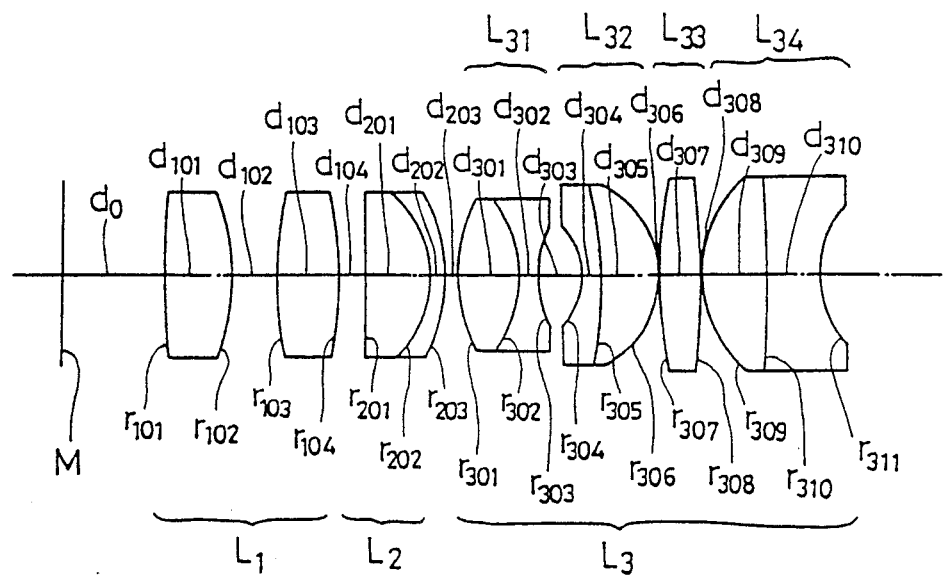
FIGS. 5 and 6 are views showing a lens configuration and aberration curve diagrams of a second embodiment, respectively.
Figure 6:
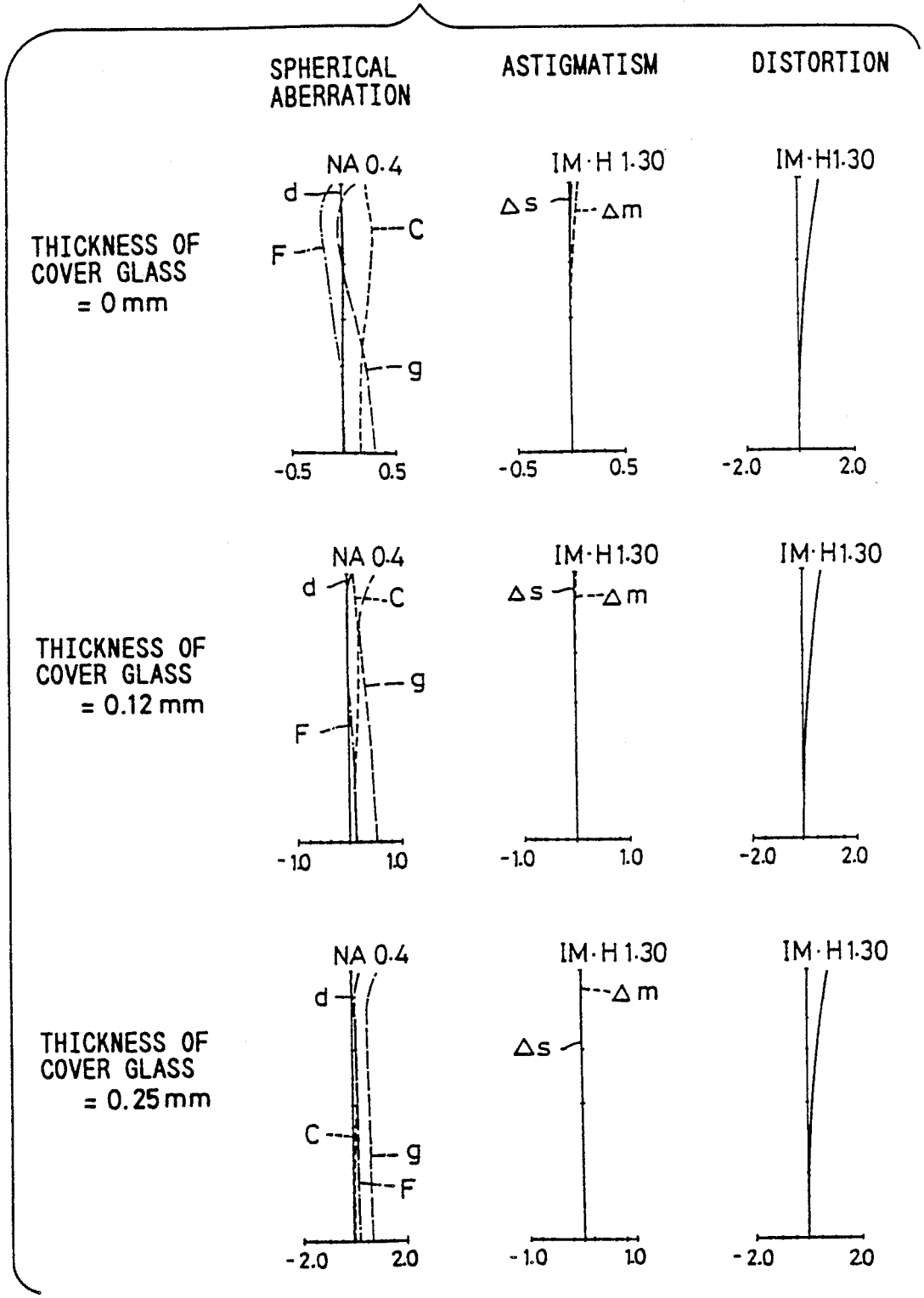

FIG. 5 is a view showing the lens configuration of this embodiment. The first lens unit $L_1$ comprises two positive lenses and the second lens unit $L_2$ is composed of a positive cemented doublet provided with the optical modulator. Aberration curves are depicted in FIG. 6.

| $\beta = 20 \times$, $f_1 = 1.186$, | NA = 0.4, $d_0 = 0.83 \sim 0.66$ | | $f = 1$, |
|---|---|---|---|
| $r_{101} = 10.315$ | | | |
| | $d_{101} = 0.48$ | $n_{101} = 1.883$ | $\nu_{101} = 40.78$ |
| $r_{102} = -1.668$ | | | |
| | $d_{102} = 0.32$ | | |
| $r_{103} = 2.738$ | | | |
| | $d_{103} = 2.74$ | $n_{102} = 1.497$ | $\nu_{102} = 81.61$ |
| $r_{104} = -2.838$ | | | |
| | $d_{104} = 0.25 \sim$ 0.18 (variable) | | |
| $r_{201} = -11.558$ | | | |
| | $d_{201} = 0.45$ | $n_{201} = 1.456$ | $\nu_{201} = 90.31$ |
| $r_{202} = -0.824$ | | | |
| | $d_{202} = 0.12$ | $n_{202} = 1.68893$ | $\nu_{202} = 31.08$ |
| $r_{203} = -1.221$ | | | |
| | $d_{203} = 0.05 \sim$ 0.13 (variable) | | |
| $r_{301} = 1.094$ | | | |
| | $d_{301} = 0.46$ | $n_{301} = 1.456$ | $\nu_{301} = 90.31$ |
| $r_{302} = -0.857$ | | | |
| | $d_{302} = 0.12$ | $n_{302} = 1.74$ | $\nu_{302} = 31.7$ |
| $r_{303} = 0.877$ | | | |
| | $d_{303} = 0.32$ | | |
| $r_{304} = -0.467$ | | | |
| | $d_{304} = 0.13$ | $n_{303} = 1.74$ | $\nu_{303} = 31.7$ |
| $r_{305} = -2.849$ | | | |
| | $d_{305} = 0.41$ | $n_{304} = 1.618$ | $\nu_{304} = 63.38$ |
| $r_{306} = -0.716$ | | | |
| | $d_{306} = 0.01$ | | |
| $r_{307} = 3.866$ | | | |
| | $d_{307} = 0.30$ | $n_{305} = 1.80518$ | $\nu_{305} = 25.43$ |
| $r_{308} = -5.664$ | | | |
| | $d_{308} = 0.01$ | | |
| $r_{309} = 0.977$ | | | |
| | $d_{309} = 0.48$ | $n_{306} = 1.66998$ | $\nu_{306} = 39.27$ |
| $r_{310} = -8.609$ | | | |
| | $d_{310} = 0.34$ | $n_{307} = 1.834$ | $\nu_{307} = 37.16$ |
| $r_{311} = 0.698$ | | | |

| Thickness of cover glass | $d_0$ | $d_{104}$ | $d_{203}$ |
|---|---|---|---|
| 0 | 0.83 | 0.25 | 0.05 |
| 0.12 | 0.75 | 0.21 | 0.09 |
| 0.25 | 0.66 | 0.18 | 0.13 |

The optical modulator is provided on the surface of $r_{202}$ in the second lens unit $L_2$.

THIRD EMBODIMENT

Figure 7:
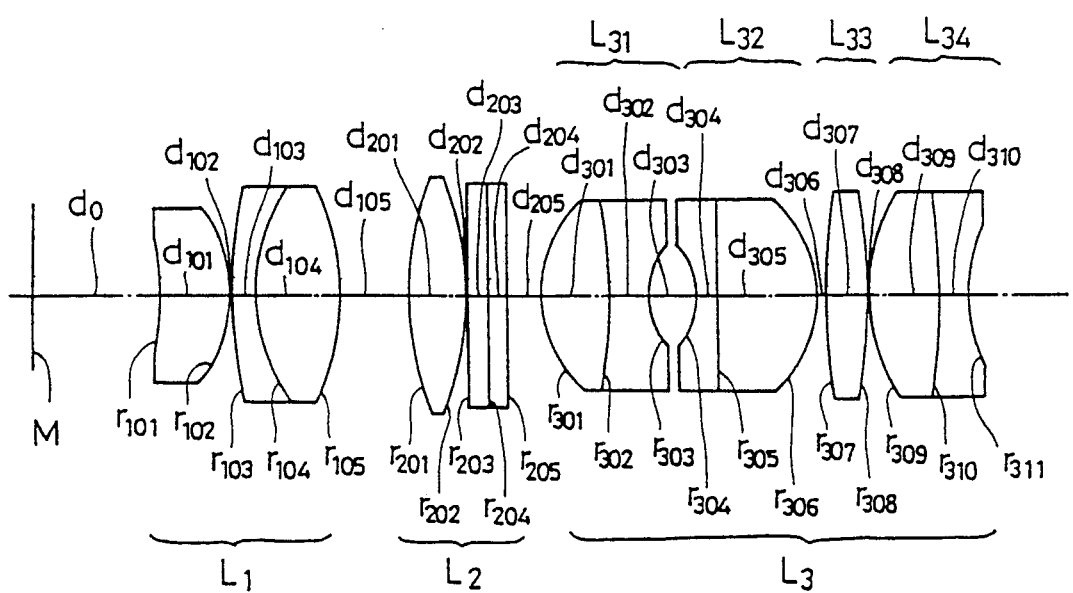

The lens configuration and aberration curves of this embodiment are shown in FIGS. 7 and 8, respectively.

| $\beta = 40 \times$, $f_1 = 1.49$, | NA = 0.55, $d_0 = 0.68 \sim 0.36$ | | $f = 1$, |
|---|---|---|---|
| $r_{101} = -2.461$ | | | |
| | $d_{101} = 0.55$ | $n_{101} = 1.841$ | $\nu_{101} = 43.23$ |
| $r_{102} = -1.146$ | | | |
| | $d_{102} = 0.02$ | | |
| $r_{103} = 4.816$ | | | |
| | $d_{103} = 0.18$ | $n_{102} = 1.74$ | $\nu_{102} = 31.7$ |
| $r_{104} = 1.599$ | | | |
| | $d_{104} = 0.66$ | $n_{103} = 1.497$ | $\nu_{103} = 81.61$ |
| $r_{105} = -2.096$ | | | |
| | $d_{105} = 0.72 \sim$ 0.34 (variable) | | |
| $r_{201} = 2.440$ | | | |
| | $d_{201} = 0.46$ | $n_{201} = 1.456$ | $\nu_{201} = 90.31$ |
| $r_{202} = -2.652$ | | | |
| | $d_{202} = 0.02$ | | |
| $r_{203} = \infty$ | | | |
| | $d_{203} = 0.16$ | $n_{202} = 1.52287$ | $\nu_{202} = 59.9$ |
| $r_{204} = \infty$ | | | |
| | $d_{204} = 0.16$ | $n_{203} = 1.52287$ | $\nu_{203} = 59.9$ |
| $r_{205} = \infty$ | | | |
| | $d_{205} = 0.13 \sim$ 0.51 (variable) | | |
| $r_{301} = 1.094$ | | | |
| | $d_{301} = 0.55$ | $n_{301} = 1.497$ | $\nu_{301} = 81.61$ |
| $r_{302} = -3.905$ | | | |
| | $d_{302} = 0.34$ | $n_{302} = 1.74$ | $\nu_{302} = 31.7$ |
| $r_{303} = 0.695$ | | | |
| | $d_{303} = 0.37$ | | |
| $r_{304} = -0.592$ | | | |
| | $d_{304} = 0.16$ | $n_{303} = 1.74$ | $\nu_{303} = 31.7$ |
| $r_{305} = \infty$ | | | |
| | $d_{305} = 0.80$ | $n_{304} = 1.497$ | $\nu_{304} = 81.61$ |
| $r_{306} = -1.102$ | | | |
| | $d_{306} = 0.07$ | | |
| $r_{307} = 4.824$ | | | |
| | $d_{307} = 0.34$ | $n_{305} = 1.78472$ | $\nu_{305} = 25.71$ |
| $r_{308} = -5.595$ | | | |
| | $d_{308} = 0.02$ | | |
| $r_{309} = 1.464$ | | | |
| | $d_{309} = 0.57$ | $n_{306} = 1.6425$ | $\nu_{306} = 58.37$ |
| $r_{310} = -6.442$ | | | |
| | $d_{310} = 0.23$ | $n_{307} = 1.816$ | $\nu_{307} = 46.62$ |
| $r_{311} = 1.289$ | | | |

| Thickness of cover glass | $d_0$ | $d_{105}$ | $d_{205}$ |
|---|---|---|---|
| 0 | 0.68 | 0.72 | 0.13 |
| 0.23 | 0.52 | 0.58 | 0.28 |
| 0.46 | 0.36 | 0.34 | 0.51 |

The optical modulator is provided on the surface of $r_{204}$ in the second lens unit $L_2$.

In the first to third embodiments mentioned above, $\beta$ is the magnification, NA is the numerical aperture, f is the compound focal length of the entire objective lens, $r_{101}$ to $r_{311}$ are the radii of curvature of individual lens surfaces, $d_{101}$ to $d_{310}$ are the thicknesses of individual lenSeS and the airspaceS between individual lenses, $n_{101}$ to $n_{307}$ are the refractive indices of individual lenses relating to the D line, $\gamma_{101}$ to $\gamma_{307}$ are the Abbe's numbers of individual lenses relating to the D line, and $d_0$ is the distance between the object surface and the first lens surface of the first lens unit.

As stated above, the objective lens for microscopes according to the present invention has the advantage significant for practical use that, even though the spaces between the lens units are varied by the correcting ring to thereby cancel the variation of aberration, the contrast of the image modulated by the optical modulator is favorable.

What is claimed is:

1. An objective lens for microscopes, comprising:
   a plurality of lens units constructed so that at least one of said lens units is moved along an optical axis to cancel variation of aberration attributed to a thickness of a cover glass; and
   an optical modulator arranged substantially at an pupil position of said microscope objective lens, said optical modulator being moved integral with said moving lens unit along the optical axis.
2. An objective lens for microscopes according to claim 1, wherein said moving lens unit includes a compound lens component and said optical modulator is an annular phase diaphragm stuck on a cemented surface of said compound lens component.

3. An objective lens for microscopes according to claim 1 or 2, wherein said objective lens further comprises a first lens unit, a second lens unit and a third lens unit so that said second lens unit is moved along the optical axis, and when a compound focal length of said objective lens is taken as f and a compound focal length of said first lens unit as $f_1$, the following condition is satisfied:

$$0.7\ f < f_1 < 1.7\ f$$

4. An objective lens for microscopes according to claim 3, wherein said third lens unit comprises a first lens component composed of a positive lens and a negative lens cemented to each other, a second lens component composed of a negative lens and a positive lens cemented to each other, a third lens component composed of a positive lens, and a fourth lens component composed of a positive lens and a negative lens cemented to each other, and when $r_{303}$ is a radius of curvature of a third surface of said first lens component, $r_{304}$ is a radius of curvature of a first surface of said second lens component, $n_{307}$ is a refractive index of the D line of said third lens component, and $d_{309}$ and $d_{310}$ are the thicknesses of the positive lens and the negative lens of said fourth lens component, respectively, the following conditions are satisfied:

$$0.6\,f < r_{303} < f$$
$$-0.7\,f < r_{304} < -0.4\,f$$
$$1.7 < n_{307}$$
$$0.4\,f < d_{309} + d_{310}$$

5. An objective lens for microscopes according to claim 4, wherein said objective lens has the following numerical data:

| $\beta = 20\times$, $f_1 = 0.897$, | NA = 0.4, $d_0 = 0.74\sim 0.57$ | | f = 1, |
|---|---|---|---|
| $r_{101} = -10.900$ | | | |
| | $d_{101} = 0.27$ | $n_{101} = 1.7725$ | $\nu_{101} = 49.66$ |
| $r_{102} = -0.870$ | | | |
| | $d_{102} = 0.02$ | | |
| $r_{103} = 1.271$ | | | |
| | $d_{103} = 0.11$ | $n_{102} = 1.74$ | $\nu_{102} = 31.70$ |
| $r_{104} = 0.784$ | | | |
| | $d_{104} = 0.26$ | $n_{103} = 1.456$ | $\nu_{103} = 90.31$ |
| $r_{105} = -8.906$ | | | |
| | $d_{105} = 0.26\sim$ 0.15 (variable) | | |
| $r_{201} = 1.591$ | | | |
| | $d_{201} = 0.26$ | $n_{201} = 1.497$ | $\nu_{201} = 81.61$ |
| $r_{202} = -4.904$ | | | |
| | $d_{202} = 0.01$ | | |
| $r_{203} = \infty$ | | | |
| | $d_{203} = 0.06$ | $n_{202} = 1.52287$ | $\nu_{202} = 59.9$ |
| $r_{204} = \infty$ | | | |
| | $d_{204} = 0.06$ | $n_{203} = 1.52287$ | $\nu_{203} = 59.9$ |
| $r_{205} = \infty$ | | | |
| | $d_{205} = 0.02\sim$ 0.13 (variable) | | |
| $r_{301} = 2.723$ | | | |
| | $d_{301} = 0.40$ | $n_{301} = 1.497$ | $\nu_{301} = 81.61$ |
| $r_{302} = -0.664$ | | | |
| | $d_{302} = 0.11$ | $n_{302} = 1.74$ | $\nu_{302} = 31.7$ |
| $r_{303} = 0.891$ | | | |
| | $d_{303} = 0.19$ | | |
| $r_{304} = -0.439$ | | | |
| | $d_{304} = 0.09$ | $n_{303} = 1.74$ | $\nu_{303} = 31.7$ |
| $r_{305} = \infty$ | | | |
| | $d_{305} = 0.33$ | $n_{304} = 1.497$ | $\nu_{304} = 81.61$ |

-continued

| $\beta = 20\times$, $f_1 = 0.897$, | NA = 0.4, $d_0 = 0.74\sim 0.57$ | | f = 1, |
|---|---|---|---|
| $r_{306} = -0.625$ | | | |
| | $d_{306} = 0.01$ | | |
| $r_{307} = 24.511$ | | | |
| | $d_{307} = 0.17$ | $n_{305} = 1.80518$ | $\nu_{305} = 25.43$ |
| $r_{308} = -1.716$ | | | |
| | $d_{308} = 0.01$ | | |
| $r_{309} = 0.897$ | | | |
| | $d_{309} = 0.28$ | $n_{306} = 1.67$ | $\nu_{306} = 57.33$ |
| $r_{310} = \infty$ | | | |
| | $d_{310} = 0.17$ | $n_{307} = 1.62374$ | $\nu_{307} = 47.1$ |
| $r_{311} = 0.712$ | | | |

| Thickness of cover glass | $d_0$ | $d_{105}$ | $d_{205}$ |
|---|---|---|---|
| 0 | 0.74 | 0.26 | 0.02 |
| 0.11 | 0.65 | 0.21 | 0.08 |
| 0.23 | 0.57 | 0.15 | 0.13 | where $\beta$ is the magnification, NA is the numerical aperture, f is the compound focal length of the entire objective lens, $f_1$ is the compound focal length of the first lens unit, $r_{101}$ to $r_{311}$ are the radii of curvature of individual lens surfaces, $d_{101}$ to $d_{310}$ are the thicknesses of individual lenses and the airspaces between individual lenses, $n_{101}$ to $n_{307}$ are the refractive indices of individual lenses relating to the D line, $\gamma_{101}$ to $\gamma_{307}$ are the Abbe's numbers of individual lenses relating to the D line, $d_0$ is the distance between an object surface and a first lens surface of the first lens unit, and the optical modulator is provided on the surface of $r_{204}$ in the second lens unit.

6. An objective lens for microscopes according to claim 4, wherein said objective lens has the following numerical data:

| $\beta = 20\times$, $f_1 = 1.186$, | NA = 0.4, $d_0 = 0.83\sim 0.66$ | | f = 1, |
|---|---|---|---|
| $r_{101} = 10.315$ | | | |
| | $d_{101} = 0.48$ | $n_{101} = 1.883$ | $\nu_{101} = 40.78$ |
| $r_{102} = -1.668$ | | | |
| | $d_{102} = 0.32$ | | |
| $r_{103} = 2.738$ | | | |
| | $d_{103} = 2.74$ | $n_{102} = 1.497$ | $\nu_{102} = 81.61$ |
| $r_{104} = -2.838$ | | | |
| | $d_{104} = 0.25\sim$ 0.18 (variable) | | |
| $r_{201} = -11.558$ | | | |
| | $d_{201} = 0.45$ | $n_{201} = 1.456$ | $\nu_{201} = 90.31$ |
| $r_{202} = -0.824$ | | | |
| | $d_{202} = 0.12$ | $n_{202} = 1.68893$ | $\nu_{202} = 31.08$ |
| $r_{203} = -1.221$ | | | |
| | $d_{203} = 0.05\sim$ 0.13 (variable) | | |
| $r_{301} = 1.094$ | | | |
| | $d_{301} = 0.46$ | $n_{301} = 1.456$ | $\nu_{301} = 90.31$ |
| $r_{302} = -0.857$ | | | |
| | $d_{302} = 0.12$ | $n_{302} = 1.74$ | $\nu_{302} = 31.7$ |
| $r_{303} = 0.877$ | | | |
| | $d_{303} = 0.32$ | | |
| $r_{304} = -0.467$ | | | |
| | $d_{304} = 0.13$ | $n_{303} = 1.74$ | $\nu_{303} = 31.7$ |
| $r_{305} = -2.849$ | | | |
| | $d_{305} = 0.41$ | $n_{304} = 1.618$ | $\nu_{304} = 63.38$ |
| $r_{306} = -0.716$ | | | |
| | $d_{306} = 0.01$ | | |
| $r_{307} = 3.866$ | | | |
| | $d_{307} = 0.30$ | $n_{305} = 1.80518$ | $\nu_{305} = 25.43$ |
| $r_{308} = -5.664$ | | | |
| | $d_{308} = 0.01$ | | |
| $r_{309} = 0.977$ | | | |
| | $d_{309} = 0.48$ | $n_{306} = 1.66998$ | $\nu_{306} = 39.27$ |
| $r_{310} = -8.609$ | | | |
| | $d_{310} = 0.34$ | $n_{307} = 1.834$ | $\nu_{307} = 37.16$ |
| $r_{311} = 0.698$ | | | |

-continued

| $\beta = 20 \times$, $f_1 = 1.186$, | | NA = 0.4, $d_0 = 0.83\sim0.66$ | | f = 1, |
|---|---|---|---|---|
| Thickness of cover glass | $d_0$ | | $d_{104}$ | $d_{203}$ |
| 0 | 0.83 | | 0.25 | 0.05 |
| 0.12 | 0.75 | | 0.21 | 0.09 |
| 0.25 | 0.66 | | 0.18 | 0.13 | where $\beta$ is the magnification, NA is the numerical aperture, f is the compound focal length of the entire objective lens, $f_1$ is the compound focal length of the first lens unit, $r_{101}$ to $r_{311}$ are the radii of curvature of individual lens surfaces, $d_{101}$ to $d_{310}$ are the thicknesses of individual lenses and the airspaces between individual lenses, $n_{101}$ to $n_{307}$ are the refractive indices of individual lenses relating to the D line, $\gamma_{101}$ to $\gamma_{307}$ are the Abbe's numbers of individual lenses relating to the D line, $d_0$ is the distance between an object surface and a first lens surface of the first lens unit, and the optical modulator is provided on the surface of $r_{202}$ in the second lens unit.

7. An objective lens for imcroscopes according to claim 4, wherein said objective lens has the following numerical data:

| $\beta = 40 \times$, $f_1 = 1.49$, | | NA = 0.55, $d_0 = 0.68\sim0.36$ | | f = 1, |
|---|---|---|---|---|
| $r_{101} = -2.461$ | | | | |
| | $d_{101} = 0.55$ | | $n_{101} = 1.841$ | $\nu_{101} = 43.23$ |
| $r_{102} = -1.146$ | | | | |
| | $d_{102} = 0.02$ | | | |
| $r_{103} = 4.816$ | | | | |
| | $d_{103} = 0.18$ | | $n_{102} = 1.74$ | $\nu_{102} = 31.7$ |
| $r_{104} = 1.599$ | | | | |
| | $d_{104} = 0.66$ | | $n_{103} = 1.497$ | $\nu_{103} = 81.61$ |
| $r_{105} = -2.096$ | | | | |
| | $d_{105} = 0.72\sim$ 0.34 (variable) | | | |
| $r_{201} = 2.440$ | | | | |
| | $d_{201} = 0.46$ | | $n_{201} = 1.456$ | $\nu_{201} = 90.31$ |
| $r_{202} = -2.652$ | | | | |
| | $d_{202} = 0.02$ | | | |

-continued

| $\beta = 40 \times$, $f_1 = 1.49$, | | NA = 0.55, $d_0 = 0.68\sim0.36$ | | f = 1, |
|---|---|---|---|---|
| $r_{203} = \infty$ | | | | |
| | $d_{203} = 0.16$ | | $n_{202} = 1.52287$ | $\nu_{202} = 59.9$ |
| $r_{204} = \infty$ | | | | |
| | $d_{204} = 0.16$ | | $n_{203} = 1.52287$ | $\nu_{203} = 59.9$ |
| $r_{205} = \infty$ | | | | |
| | $d_{205} = 0.13\sim$ 0.51 (variable) | | | |
| $r_{301} = 1.094$ | | | | |
| | $d_{301} = 0.55$ | | $n_{301} = 1.497$ | $\nu_{301} = 81.61$ |
| $r_{302} = -3.905$ | | | | |
| | $d_{302} = 0.34$ | | $n_{302} = 1.74$ | $\nu_{302} = 31.7$ |
| $r_{303} = 0.695$ | | | | |
| | $d_{303} = 0.37$ | | | |
| $r_{304} = -0.592$ | | | | |
| | $d_{304} = 0.16$ | | $n_{303} = 1.74$ | $\nu_{303} = 31.7$ |
| $r_{305} = \infty$ | | | | |
| | $d_{305} = 0.80$ | | $n_{304} = 1.497$ | $\nu_{304} = 81.61$ |
| $r_{306} = -1.102$ | | | | |
| | $d_{306} = 0.07$ | | | |
| $r_{307} = 4.824$ | | | | |
| | $d_{307} = 0.34$ | | $n_{305} = 1.78472$ | $\nu_{305} = 25.71$ |
| $r_{308} = -5.595$ | | | | |
| | $d_{308} = 0.02$ | | | |
| $r_{309} = 1.464$ | | | | |
| | $d_{309} = 0.57$ | | $n_{306} = 1.6425$ | $\nu_{306} = 58.37$ |
| $r_{310} = -6.442$ | | | | |
| | $d_{310} = 0.23$ | | $n_{307} = 1.816$ | $\nu_{307} = 46.62$ |
| $r_{311} = 1.289$ | | | | |
| Thickness of cover glass | $d_0$ | | $d_{105}$ | $d_{205}$ |
| 0 | 0.68 | | 0.72 | 0.13 |
| 0.23 | 0.52 | | 0.58 | 0.28 |
| 0.46 | 0.36 | | 0.34 | 0.51 | where $\beta$ is the magnification, NA is the numerical aperture, f is the compound focal length of the entire objective lens, $f_1$ is the compound focal length of the first lens unit, $r_{101}$ to $r_{311}$ are the radii of curvature of individual lens surfaces, $d_{101}$ to $d_{310}$ are the thicknesses of individual lenses and the airspaces between individual lenses, $n_{101}$ to $n_{307}$ are the refractive indices of individual lenses relating to the D line, $\gamma_{101}$ to $\gamma_{307}$ are the Abbe's numbers of individual lenses relating to the D line, $d_0$ is the distance between an object surface and a first lens surface of the first lens unit, and the optical modulator is provided on the surface of $r_{204}$ in the second lens unit.

* * * * *